(12) United States Patent
Reiser (10) Patent No.: US 6,497,971 B1
(45) Date of Patent: Dec. 24, 2002

(54) METHOD AND APPARATUS FOR IMPROVED DELIVERY OF INPUT REACTANTS TO A FUEL CELL ASSEMBLY

(75) Inventor: Carl A. Reiser, Stonington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/265,139

(22) Filed: Mar. 8, 1999

(51) Int. Cl.$^7$ ................................................ H01M 8/04
(52) U.S. Cl. ............................ 429/13; 429/22; 429/23; 429/24; 429/34
(58) Field of Search ............................. 429/12, 13, 22, 429/23, 24, 34, 38, 39

(56) References Cited

U.S. PATENT DOCUMENTS

| | | | |
|---|---|---|---|
| 3,441,444 A | * 4/1969 | Chesner et al. ................ | 429/24 |
| 3,994,748 A | 11/1976 | Kunz et al. .................... | 429/13 |
| 4,178,770 A | * 12/1979 | Fox .............................. | 62/186 |
| 4,212,929 A | 7/1980 | Grevstad et al. ............... | 429/37 |
| 4,599,282 A | * 7/1986 | Hirota et al. .................. | 429/26 |
| 4,859,545 A | * 8/1989 | Scheffler et al. .............. | 429/17 |
| 4,910,099 A | 3/1990 | Gottesfeld .................... | 429/13 |
| 5,154,986 A | 10/1992 | Takechi et al. ................ | 429/23 |
| 5,316,747 A | 5/1994 | Pow et al. .................... | 423/247 |
| 5,330,727 A | 7/1994 | Trocciola et al. ............. | 422/177 |
| RE35,002 E | * 7/1995 | Matsubara et al. ............. | 429/12 |
| 5,432,021 A | 7/1995 | Wilkinson et al. ............. | 429/17 |
| 5,456,889 A | 10/1995 | Pow et al. .................... | 422/173.1 |
| 5,482,680 A | 1/1996 | Wilkinson et al. ............. | 422/177 |
| 5,486,430 A | 1/1996 | Gorbell et al. ................ | 429/35 |
| 5,503,944 A | * 4/1996 | Meyer et al. .................. | 429/13 |
| 5,510,202 A | * 4/1996 | McCoy ......................... | 429/19 |
| 5,514,487 A | 5/1996 | Washington et al. ........... | 429/39 |
| 5,518,705 A | 5/1996 | Buswell et al. ............... | 423/437 M |
| 5,798,186 A | 8/1998 | Fletcher et al. .............. | 429/13 |
| 5,932,365 A | * 8/1999 | Lin et al. ..................... | 429/12 |
| 6,057,051 A | * 5/2000 | Uchida et al. ................ | 429/19 |

FOREIGN PATENT DOCUMENTS

| | | | |
|---|---|---|---|
| JP | 58-201266 | * | 11/1983 |
| JP | 59-207565 | * | 11/1984 |
| JP | 61-233978 | | 10/1986 |
| JP | 62-211869 | | 9/1987 |
| JP | 4-274174 | * | 9/1992 |
| JP | 7-282832 A | * | 10/1995 |
| JP | 11-185791 | | 7/1999 |

* cited by examiner

Primary Examiner—Stephen Kalafut
Assistant Examiner—Jonathan Crepeau
(74) Attorney, Agent, or Firm—McCormick, Paulding & Huber LLP (57) ABSTRACT

Disclosed is a fuel cell stack assembly for use in a fuel cell power plant and for producing electricity from fuel and oxidizer reactants. The fuel cell stack assembly includes a plurality of individual fuel cells each having an electrolytic medium, a cathode and an anode, and the cell stack assembly is adapted for defining anode flow fields for exposing the anodes to a fuel, cathode flow fields for exposing the cathodes to an oxidant. Also included are input and output manifolds defining input and output inner volumes in fluid communication with the cathode flow fields, and at least one blower mounted with one of the manifolds for flowing oxidizer through cathode flow fields. The blower can be mounted within an inner volume defined by a manifold, and can be a vane axial or centrifugal blower, and can be driven by a variable speed motor. Multiple blowers can be associated with the cell stack assembly, and can either push or pull (or both) the oxidizer through the cathode flow fields. In a fuel cell stack assembly having fuel cells arranged in separate stacks, each stack has a blower associated therewith.

2 Claims, 6 Drawing Sheets

METHOD AND APPARATUS FOR IMPROVED DELIVERY OF INPUT REACTANTS TO A FUEL CELL ASSEMBLY

FIELD OF THE INVENTION

This invention relates to fuel cells, and more particularly to methods and apparatus for the improved delivery of input reactants to fuel cells.

BACKGROUND OF THE INVENTION

Many types of fuel cells are known in the art, such as solid oxide, molten carbonate, phosphoric acid and proton exchange membrane (PEM) fuel cells. Fuel cells generate electricity by directly converting chemical energy to electrical energy. In a typical fuel cell, an electrolytic medium separates an anode and a cathode. A voltage is produced between the anode and cathode when a fuel is introduced to the anode, an oxidant is introduced to the cathode and the cell is maintained within the correct temperature range. The electrolytic medium allows an ionic species to travel between the cathode and the anode.

The reaction products generated by the fuel cell are relatively simple and benign, typically including water and carbon dioxide, thus minimizing environmental concerns. In contrast with fossil fuel based power sources, such as the internal combustion engine, fuel cells are simpler, quieter, nonpolluting and have high operating efficiencies. For these and other reasons, fuel cells are considered promising power sources for the future.

In practice, however, a fuel cell power plant can be complex. Considerable hardware may be required to support the fuel cells, which are typically arranged in an electrically-connected cell stack assembly (CSA). Such hardware can include a thermal management subsystem for maintaining the cell stack assembly at the proper temperature, a water management subsystem for handling water generated as a reaction product of operating the cell stack assembly and for maintaining proper humidity throughout the power plant, a fuel subsystem for processing and delivering the fuel reactant to the cell stack assembly, and a blower for delivering the oxidant to the cell stack assembly.

Figure 1:
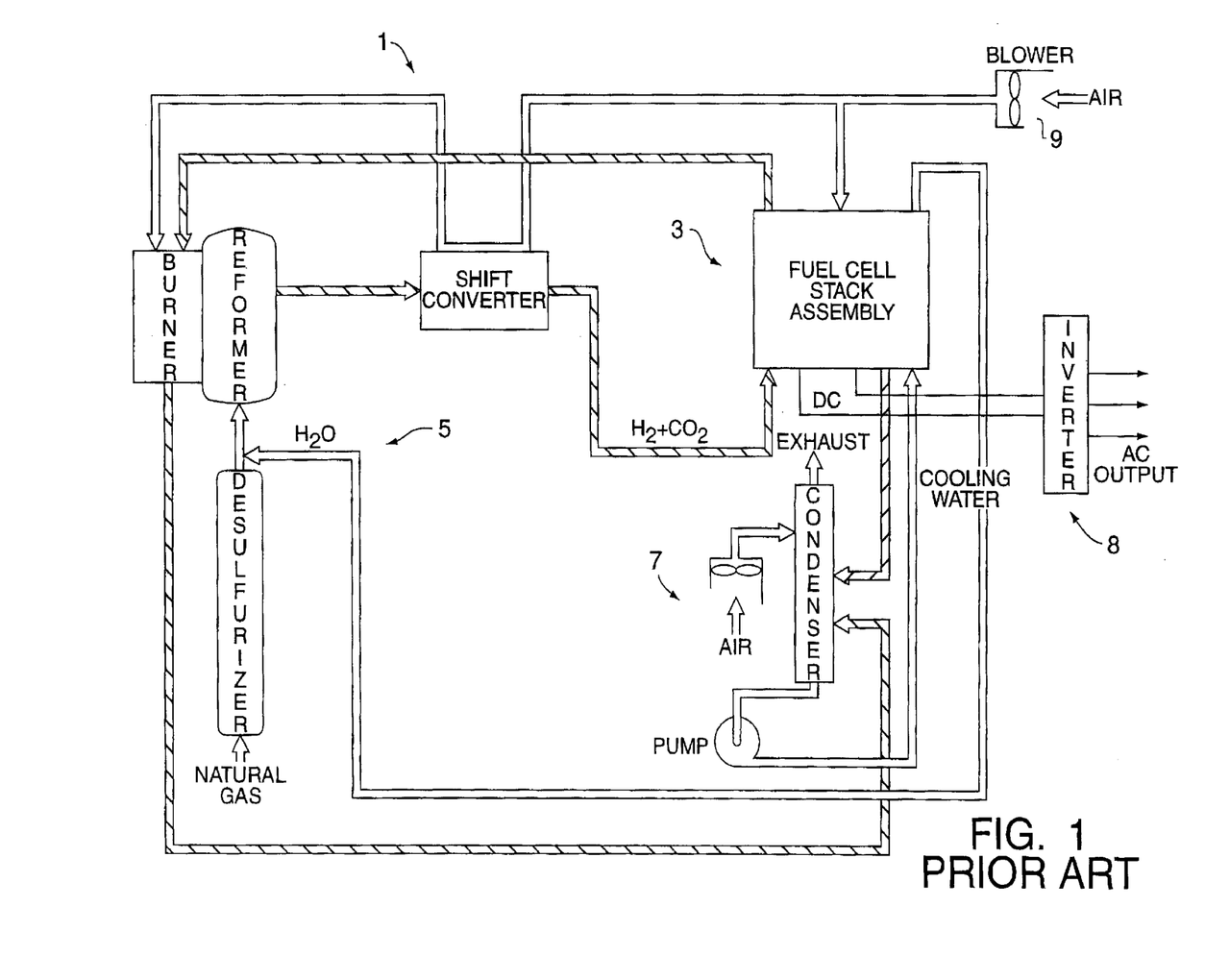
FIG. 1 illustrates one example of a prior art fuel cell plant.

FIG. 1 illustrates a typical fuel cell power plant 1 including a fuel cell stack assembly 3. Reference numeral 5 generally indicates the components of a typical fuel processing subsystem, and reference numeral 7 indicates components of at typical thermal management subsystem. The thermal management subsystem 7 can also include provision for water management, such as provision for the recycling of water that is generated as a reaction product of operating the fuel cell stack assembly 3. The inverter 8, if required, converts the d.c. output of the fuel cell stack assembly 3 to a.c. for provision to an electrical power grid. For some applications, such as powering an electric motor in an automobile, a motor drive replaces the inverter. The fuel cell power plant 1 is merely exemplary, and, as understood by one of ordinary skill in the art, the components and subsystems of a fuel cell power plant 1 can vary depending on the application - a phosphoric acid stationary power plant for industrial use will differ from a mobile - (PEM) power plant. Furthermore, a mobile PEM power plant that can be provided with hydrogen as a fuel reactant can differ considerately from a PEM plant for installation in an automobile, which can be required to include a subsystem for producing hydrogen fuel from gasoline. In general, a fuel cell power plant includes those subsystem components necessary for the application for which the power plant is to be used, and that are appropriate to the type of fuel cells incorporated by the fuel cell power plant.

The delivery of input reactants is particularly important in a fuel cell stack assembly. The rate of the delivery of the input reactants affects the power output and efficiency of each of the individual cells that make up the cell stack assembly and also the amount of thermal energy that must be removed from a particular portion of the cell stack assembly to maintain the proper operating temperature. Typically, the oxidant input reactant is delivered by a single blower, such as the single blower 9 in FIG. 1, which provides oxidant at slightly above ambient pressure to all the individual cells of the fuel cell stack assembly 3. The input oxidizer reactant is delivered at a rate that, on average, provides the proper operating stochiometry, temperature and power output of the cell stacks that make up a typical fuel cell stack assembly 3.

However, use of a single blower is not entirely satisfactory. The blower is usually fairly large, consumes considerable power, and can be noisy in operation. Furthermore, all the cells of the cell stack assembly are serviced by the same blower, and hence the performance thereof is more difficult to individually enhance.

Accordingly, it is an object of the invention to provide improved methods and apparatus for the delivery of input reactants to fuel cells.

SUMMARY OF THE INVENTION

According to one aspect, the invention provides a fuel cell stack assembly for use in a fuel cell power plant and for producing electricity from fuel and oxidant reactants. The fuel cell stack assembly includes a plurality of individual fuel cells each having an electrolyte, cathode and anode, and the cell stack assembly is adapted for defining anode flow fields for exposing the anodes to a fuel, cathode flow fields for exposing the cathodes to an oxidant, and for preventing the commingling of the fuel and oxidant reactants between adjacent anodes and cathodes. Also included are input and output manifolds in fluid communication with the cathode flow fields, and at least one blower mounted with one of the manifolds for flowing oxidant through the cathode flow fields.

The blower can be mounted with one of the manifolds, such as within the inner volume defined by the manifold, typically at or near a manifold wall, and can be a vane axial or centrifugal blower, and can be driven by a variable speed motor. Preferably, the blower is positioned in or near a manifold wall and facing the cells of the cell stack assembly. Multiple, blowers can be mounted with the manifolds of a cell stack assembly, and can either push or pull, or both, the oxidant through the cathode flow fields.

According to another aspect, the invention provides an improved fuel cell power plant having a plurality of fuel cell stack assemblies. Each cell stack assembly includes a plurality of individual fuel cells and has intake and exhaust manifolds in fluid communication with the cathode flow fields of the assembly for providing and removing oxidant from the stack assemblies. The improvement includes a plurality of blowers, each of which is associated with one of the plurality of fuel cell stack assemblies for flowing oxidant in the cathode flow fields thereof. A plurality of sensors can be included for sensing operating characteristics of the fuel cell stack assemblies, and the invention can include a controller in electrical communication with the sensors and the blowers for controlling the delivery of oxidizer by the blowers responsive to the sensors. Sensors can be of several types, and can include sensors for sensing temperature, voltage, current, oxygen concentration and humidity. A particularly useful sensor to employ is an oxygen concentration sensor located for sensing an oxygen concentration in or related to the cathode flow fields, as the output of the fuel cells is directly proportional to this oxygen concentration.

The invention also includes methods for delivering input reactants to a fuel cell stack assembly including a plurality of individual fuel cells and adapted for providing anode and cathode flow fields for exposing the anodes and cathodes of the individual fuel cells to a reducing and oxidant reactants, respectively. The method includes the steps of providing oxidant input and exhaust manifolds in fluid communication with the cathode flow fields; mounting at least one blower with one of the manifolds for controlling the flow of the oxidant through the cathode flow fields; and operating the blower to selectively flow the oxidant to the cathode flows fields for controlling one of the temperature, voltage, current, oxygen concentration and the electrical power output of the fuel cell stack assembly of selected fuel cells thereof. For example, the method can also include determining a temperature characteristic of the fuel cell stack assembly and controlling the blower responsive to the temperature. The step of controlling can include increasing the flow of the oxidizer when the temperature is below approximately a selected temperature and reducing the flow rate when the temperature is above approximately at selected temperature.

In yet another aspect, a method practiced in accordance with the invention for providing oxidant input reactants to a fuel cell power plant having a plurality of fuel cell stack assemblies includes the steps of providing a plurality of blowers; associating the blowers with the fuel cell stack assemblies for flowing oxidant in the cathode flow fields of the assemblies such that each blower is associated with a fuel cell stack assembly; and operating the blowers for flowing oxidant through the flow fields of the fuel cell stacks.

These and other features of the invention are more fully set forth with reference to the following detailed description, and the accompanying drawings.

DETAILED DESCRIPTION OF THE PREFERRED EMBODIMENTS

Figure 2:
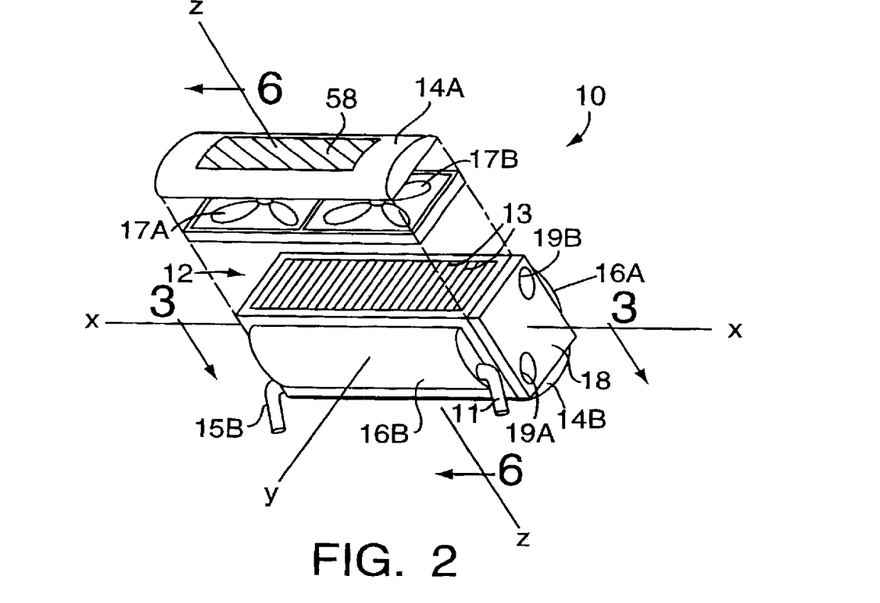
FIG. 2 is a perspective, partially exploded view of a fuel cell stack assembly according to the invention.

FIG. 2 is a perspective, partially exploded view of a fuel cell stack assembly 10 according to the invention. The fuel cell stack assembly 10 includes a stack 12 of individual fuel cells 13, shown as horizontally stacked along the X axis of FIG. 2. Typically, the individual cells in the cell stack assembly are stacked either horizontally or vertically. The oxidant input manifold 14A and the output manifold 14B, which includes an external output port 15B, direct a flow of oxidant reactant to the individual fuel cells 13 of the fuel cell stack assembly 10, while fuel input and output manifolds 16A and 16B, having external input and output ports (only one port 11 is shown) direct a flow of fuel reactant, typically a hydrogen-rich fuel, to the individual fuel cells 13 of the fuel cell stack assembly 10. The end plate 18 can include input and output ports 19A and 19B for circulating a thermal fluid through the cell stack assembly 10 for thermal management thereof, that is, for cooling or heating the individual fuel cells such that the proper operating temperatures are maintained for the desired operation of the fuel cell stack assembly 10. Typically, the thermal fluid is a coolant for cooling the cell stack assembly 10. However, certain types of fuel cell apparatus can require heating to initially achieve the proper operating temperature.

According to the invention, blowers 17A and 17B are associated with the fuel cell stack assembly 10, such as by being mounted with the oxidizer manifold 14A, such as within an inner volume defined by the manifold 14A, as shown in FIG. 2. Mounting the blowers 17 with the fuel cell apparatus is considered to have several advantages. The blowers can be low power, relatively quiet, and include variable speed motors, such as a variable speed a.c. or d.c. motors, that can be controlled to tailor the flow of oxidant in accordance with the individual needs of the fuel cell stack assembly 10. The use of multiple blowers provides a measure of redundancy should one blower fail. The blowers 17A and 17B can be individually controlled to accommodate differing requirements of subsets of a selected number of the individual fuel cells 13 that make up the cell stack assembly 10. For example, the blower 17B flows oxidizer primarily through the right half of the stack 12, while the blower 17A flows oxidant primarily through the left half of the cell stack 12. The blowers 17A and 17B can be run at different speeds to equalize or otherwise compensate for a variations in voltage, power output, temperature, or oxygen concentration between the right half and left half of the stack 12 of the individual fuel cells 13.

The depiction of two blowers 17A and 17B is exemplary, as any number of blowers can be associated with the fuel cell apparatus, and can be mounted with one or both of the manifolds 14. The blowers 17 can be mounted with the manifolds 14 in a variety of ways, such as within inner volumes defined by the manifolds, or on the outside of the manifolds, such as in the place of the ambient air window 58. Preferably, a blower 17 mounts within an inner volume defined by a manifold, so as to reduce the packaging volume of the fuel cell stack assembly 10, as is discussed in more detail below.

Figure 3A:
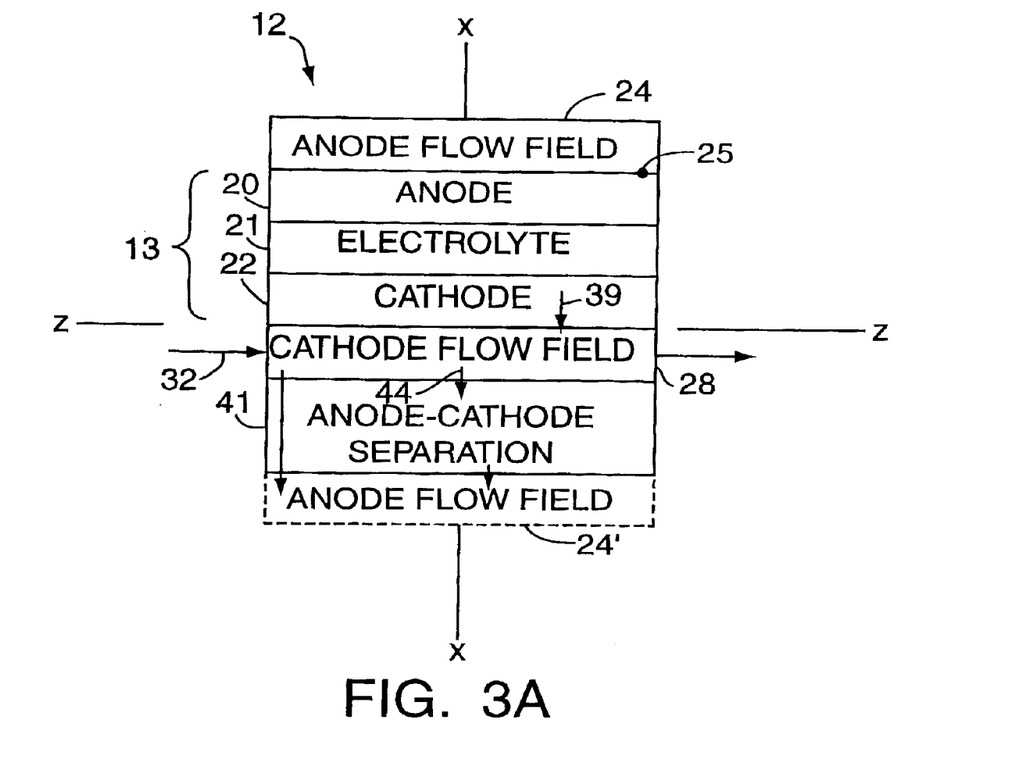
FIG. 3A is a partial cross section, take along section 3—3 of FIG. 2, schematically illustrating the cell stack assembly of FIG. 2.
Figure 3B:
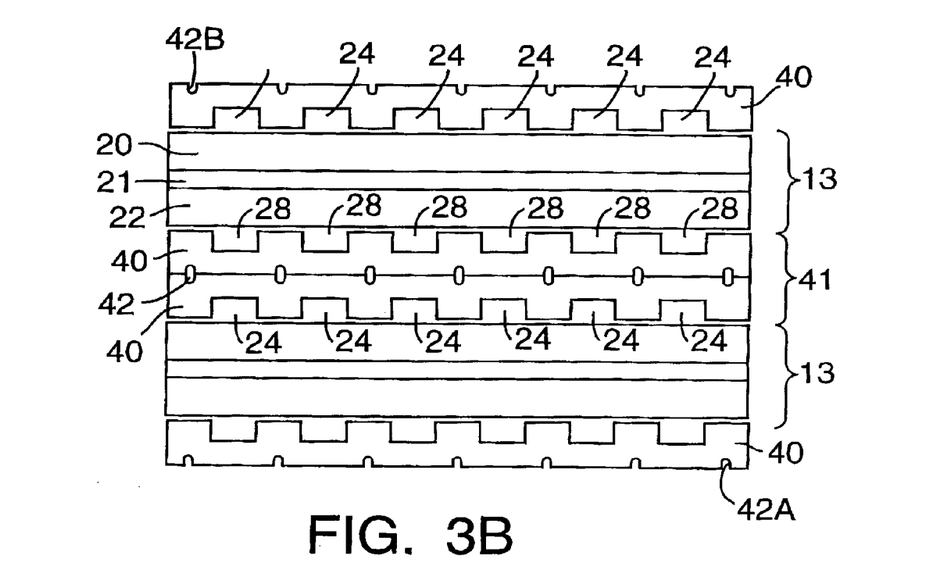
FIG. 3B illustrates one example of structure for realizing the schematic of FIG. 3A.

Reference is now made to FIGS. 3A and 3B for additional detail relevant to the cell stack assembly 10, prior to returning to a discussion of FIG. 1. FIG. 3 schematically illustrates an individual fuel cell 13 of the cell stack 12 in additional detail and corresponds to a partial cross section taken along the section line 3—3 of FIG. 2. An individual fuel cell 13 includes an anode 20, an electrolytic medium 21, and a cathode 22. In a proton exchange membrane (PEM) fuel cell, the electrolytic medium 21 includes a proton exchange (PEM) membrane. As understood by those of ordinary skill in the art, the fuel cell 13 can include other layers omitted for simplicity from FIG. 3A, such as substrate layers and bi-layers adjacent the cathode 21 and the anode 20. The fuel cell assembly 10 is adapted for defining an anode flow field 24 for exposing the anode 20 to fuel, and a cathode flow field 28 for exposing the cathode 22 to an oxidant, such as air. Reference number 32 indicates oxidant reactant flow. The anode and cathode flow fields, 24 and 28 respectively, are shown as functional blocks in FIG. 3A as there are a variety of ways in which a cell stack assembly can be adapted for providing such flow fields. Typically, as is discussed in conjunction with FIG. 3B below, the cell stack assembly 10 includes plates having channels or grooves for exposing the anode 20 to fuel and the cathode 22 to oxidant.

In operation of the cell stack assembly 10, the anode flow field 24 receives fuel from an input, such as from one of the manifolds 16A and 16B. In a fuel cell with a PEM or acid electrolyte, the fuel is reduced at the anode 20, liberating electrons and H+ ions. The H+ ions travel through the electrolytic medium 21 to the cathode 22, where they unite with the oxidant and electrons from the anode to form water that enters the cathode flow field 28, as indicated by reference numeral 39. The process is typically exothermic. The anode 20 and cathode 22 develop a potential there between, and an electrical load connected across the anode 20 and the cathode completes an electrical circuit, providing a path for electrons generated at the anode 20 to transfer to the cathode 22.

As noted above, the fuel cell 13 described herein is representative; typically the cell stack assembly 10 includes a plurality of cells 13 stacked on top of one another, as partially indicated by the depiction of another anode flow field 24' below the cathode flow field 28.

FIG. 3B illustrates one example of structure included in cell stack 15 assembly 10 for defining the anode, cathode and coolant flow fields. The individual fuel cells 13 are sandwiched between plates 40 having channels therein that define the cathode and anode flow fields 24 and 28 indicated in FIG. 3B. The plates 40 also include grooves or channels defining a coolant flow field 42 for flowing a thermal fluid through the cell stack assembly 10, which can include axial passages for communication of thermal fluid between the other coolant flow fields, such as those partially illustrated as 42A and 42B in FIG. 3B. The plates 40 can be fine pore plates allowing water removal from the cathode flow field 28 and use of the water by the fuel cell power-plant into which the fuel cell stack assembly is incorporated. Water travels from the cathode flow field 28 to the coolant flow field, as indicated by reference numeral 44 in FIG. 3A, where it can be circulated in a coolant loop. Water can also travel from the coolant flow field 28 to and from the anode flow field 24 for preventing the drying out of the electrolytic medium 21. Water flow can be directed by maintaining selected pressure differentials between the various flow fields. The use of fine pore plates is part of a technique known as "internal water recovery" often practiced with PEM type fuel cells. Alternatively, the plates 40 may be a dense graphite or graphite-polymer composite, as well known by one skilled in the art.

The cell stack assembly 10 is adapted for separating adjacent cathode and anode flow fields to prevent commingling of oxidizer and fuel reactants. Block 41 schematically illustrates the separation of adjacent anode and cathode flow fields, such as cathode flow field 28 and anode flow field 24', to prevent commingling of oxidizer and fuel reactants. The anode-cathode flow field separation indicated by block 41 can be accomplished by the plate structure such as that shown in FIG. 3B. Similar structure to that of FIG. 3B is disclosed in U.S. Pat. No. 5,503,944, issued to Meyer et al. on Apr. 2, 1996 and herein incorporated by reference.

The cell stack assembly 10 need not have the particular form shown in FIG. 3A, and can include components in addition to those shown in FIG. 3A. In particular, as under stood by one of ordinary skill in the art, in light of the disclosure herein, the cell stack assembly 10 need not be adapted for defining a coolant flow field and/or for employing internal water recovery. For example, in certain instances the stack assembly 10 can include cooling fins for thermal management of the cell stack assembly 10.

Returning to FIG. 2, the blowers 17A and 17B can either "push" or "pull" the oxidant reactant through the cell stack assembly 10, such that the manifold 14A is in the first instance an input manifold and in the second instance an output manifold. The blowers can be independently controllable for tailoring the flow of oxidant reactant to those individual fuel cells that have their oxidant flow affected a particular blower. For example, the operating characteristics of the right and left halves of the cell stack assembly 10 can be independently varied by independently controlling the blowers 17A and 17B. The depiction of two blowers 17A and 17B is exemplary, and one blower or more than two blowers can be used. An inlet or exhaust window 58 can be provided in the manifold 14A for drawing oxidant from, or venting oxidant to, the ambient environment. The window 58 can include a valve for controlling the flow of oxidant through the window.

Figure 4:
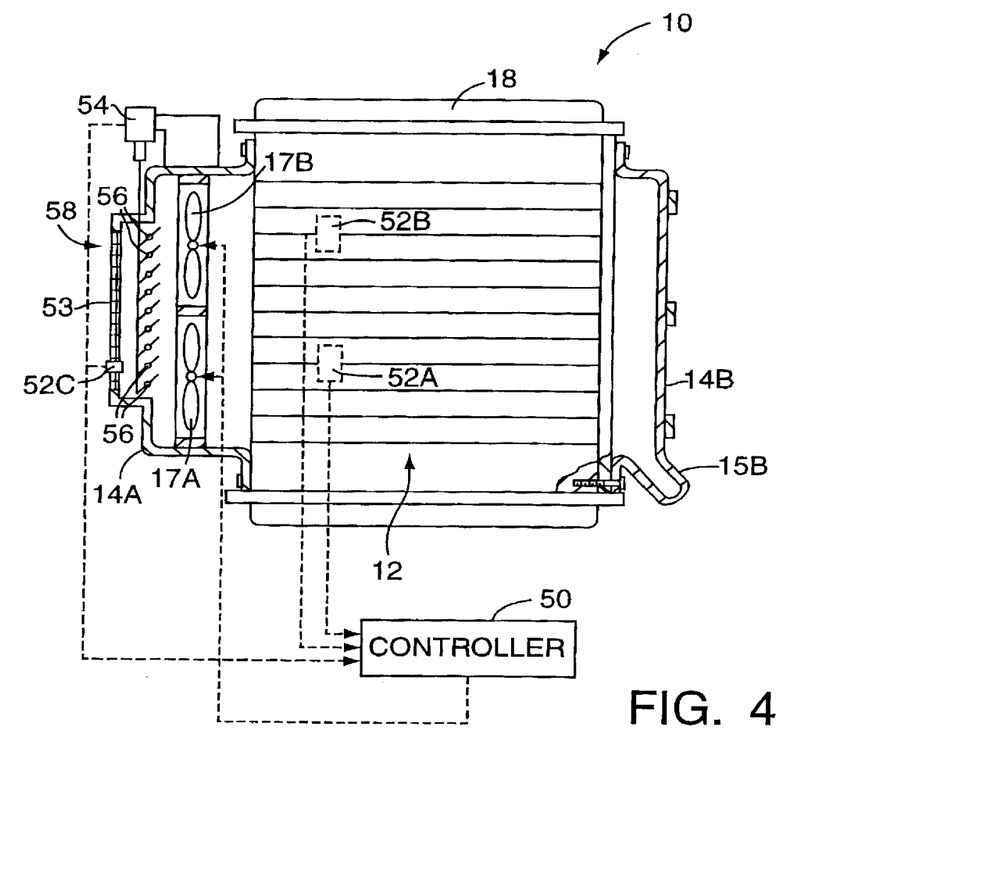
FIG. 4 illustrates a cell stack assembly including sensors and a controller for controlling the blowers of the cell stack assembly responsive to the sensors.

FIG. 4 illustrates a cell stack assembly 10 and a controller 50 for controlling the blowers 17A and 17B responsive to sensors 52A and 52B. The sensors 52A and 52B can be temperature sensors, or can sense other operating parameters, or operating characteristics, relevant to the operation of the fuel cell stack assembly 10. An operating parameter, or characteristic, is any information that is useful for controlling the operation of the fuel cells via controlling one or more of the blowers 17. Accordingly, useful sensors can include temperature sensors, voltage sensors, oxygen sensors and humidity sensors. Sensors may be located within the cell assembly, such as within the inner volumes defined by the manifolds, or within or adjacent an individual fuel cell 13. Sensors can be located elsewhere within the fuel cell power plant. The sensor 52A primarily senses that portion of cell stack assembly 10 that is provided oxidant flow by the blower 17A, while the sensor 52B senses that portion of the cell through which the blower 17B flows oxidant. Sensors can also be disposed in the window, as indicated by sensor 52C. The window 58 can include an air filter 53 and a valve, such as louvers 56, controlled by a control mechanism, such as the solenoid 54, that controls the air flow through the window 58 responsive to the controller 50.

Figure 5:
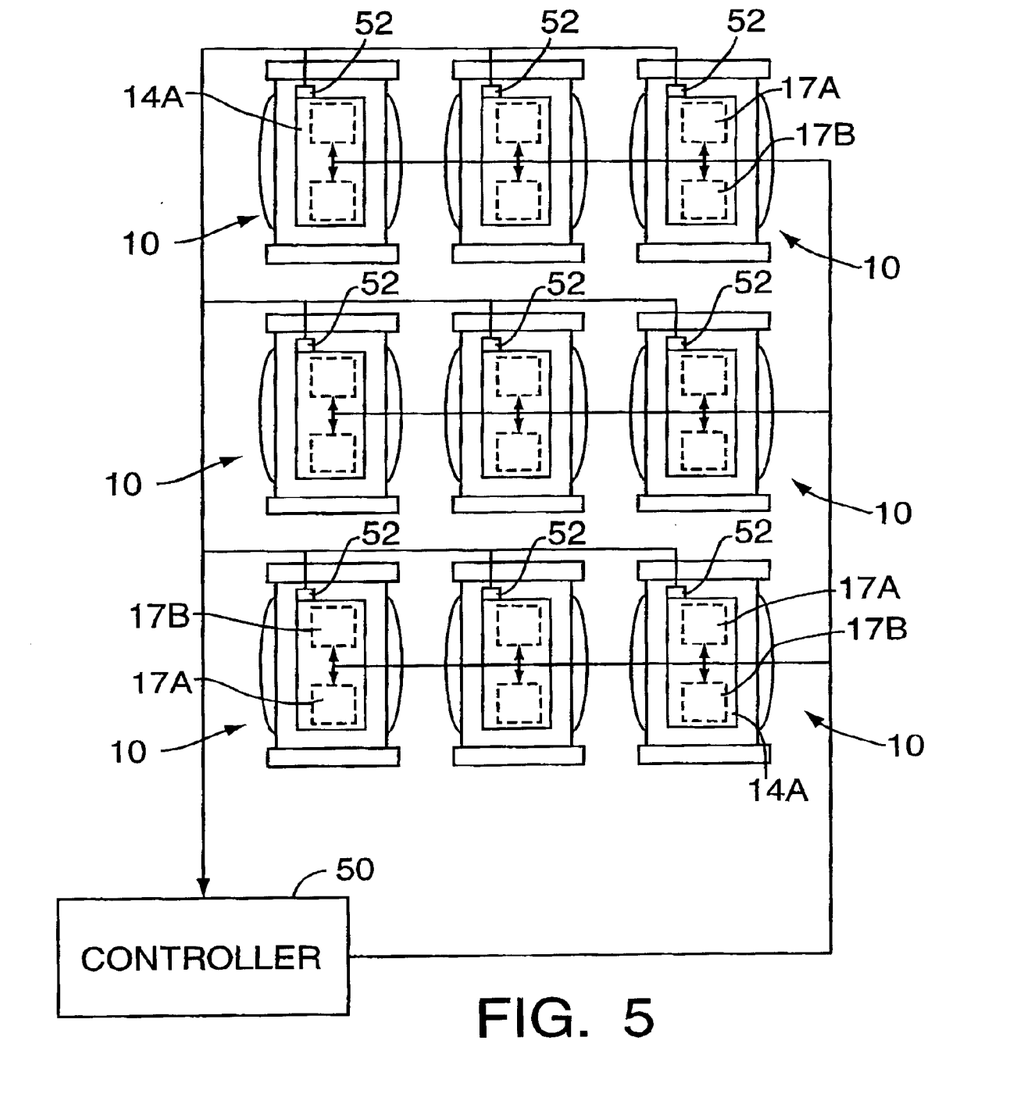
FIG. 5 illustrates multiple fuel cell stack assemblies, each stack having a sensor and at least one blower, and controller for controlling the blowers responsive to the sensors.

FIG. 5 illustrates multiple cell stack assemblies, each having a sensor 52 and blowers 17A and 17B associated therewith. Associating a blower(s) with a particular stack assembly 10 or other grouping of fuel cell stack assemblies, allows control of that stack assembly 10 (or grouping) while minimally affecting other cell assemblies 10. The sensors 52 and blowers 17 are in electrical communication with the controller 50, and the controller can individually vary the speed of the blowers 17 responsive to the sensors 52. For example, the sensors 52 can sense temperature. Typically, the outer fuel cell stack assemblies 10, such as those at the corners of FIG. 5, will run cooler than those in the center. Accordingly, the controller 50 can increase the flow of oxidizer to those fuel cell stack assemblies 10 that are running cooler so as to increase the reaction rate, thereby increasing the temperature of the cooler cell stack assemblies 10.

Figure 6:
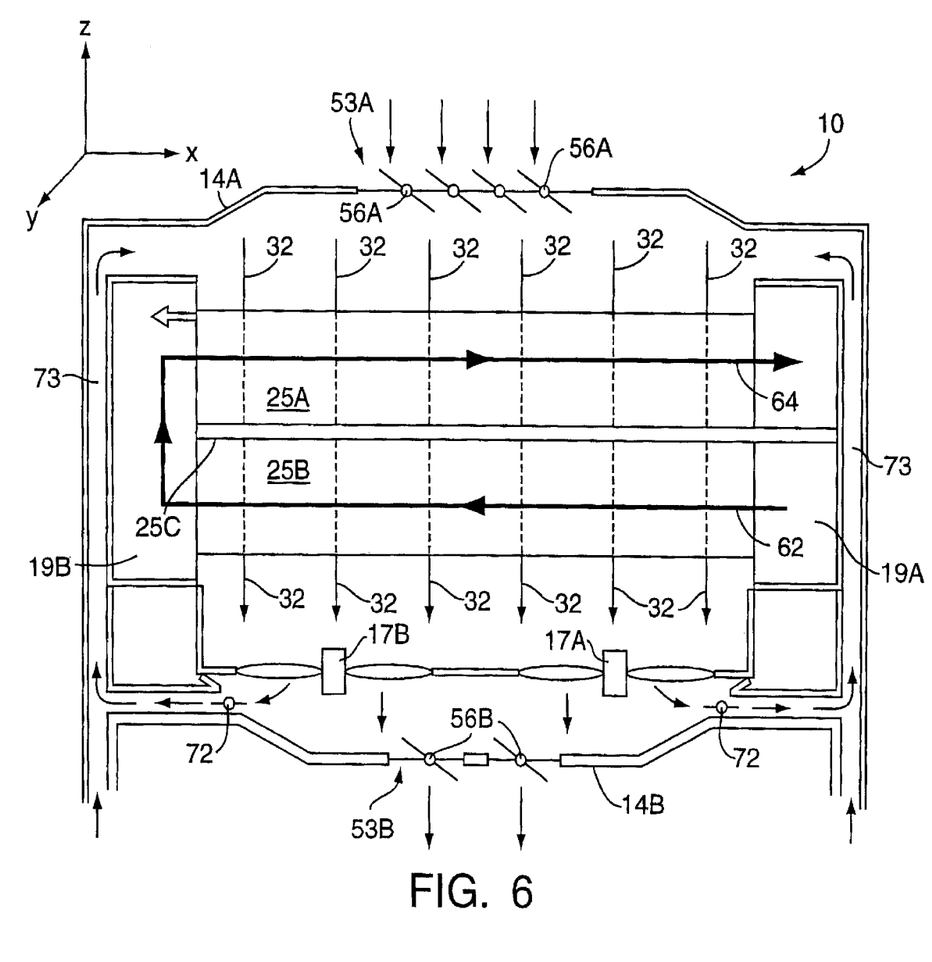
FIG. 6 illustrates an end view, such as along the section line 6—6 of FIG. 2, of another embodiment of a fuel cell stack assembly according to the invention.

FIG. 6 illustrates an elevational view, such as along the section line 6—6 of FIG. 2, of another embodiment of a fuel cell stack assembly 10 according to the invention. The surface of an anode 25 of an individual fuel cell 13 is indicated by reference numerals 25A and 25B, which refer to portions of the anode surface which are fluidly separated by the divider 25C. Reference numbers 62 and 64 indicate the flow path of the fuel reactant, which is turned by the turning fuel manifold 19B. Reference number 32 indicates oxidant reactant flow. General design features of cell assemblies that include fuel turning manifolds are disclosed in U.S Pat. No. 3,994,748, issued on Nov. 30, 1976 to Kunz et al. and herein incorporated by reference. Bypass valves 72 recycle a selected portion of the oxidizer reactant via recycling channel 73. The recycled oxidant passes around the fuel manifolds 19, ducting any fuel leaking from the fuel manifold back through the cathode flow field 22 where the cathode catalyst can act as a catalytic converter to safely react the leaked fuel reactant with the oxidant. The blowers 17A and 17B pull the oxidizer through the cell stack assembly 10, and windows 53A and 53B can include valves 56A and 56B, respectively, for selectively drawing air from, and exhausting the oxidizer reaction to the ambient environment. In another practice of the invention similar to the embodiment shown in FIG. 6, a single blower mounted with the manifold 14B pushes oxidizer reactant through fuel cell stack assembly 10.

Figure 7A:
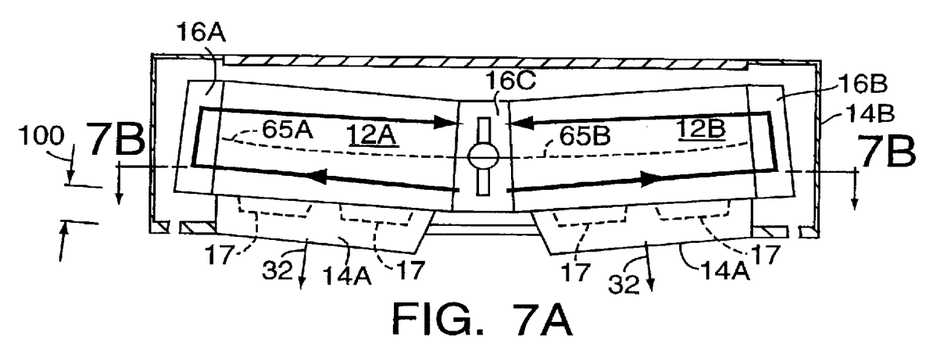
FIGS. 7A and 7B illustrates a cell stack assembly that includes twin cell stacks sharing common manifolding and including fuel turning manifolds.
Figure 7B:
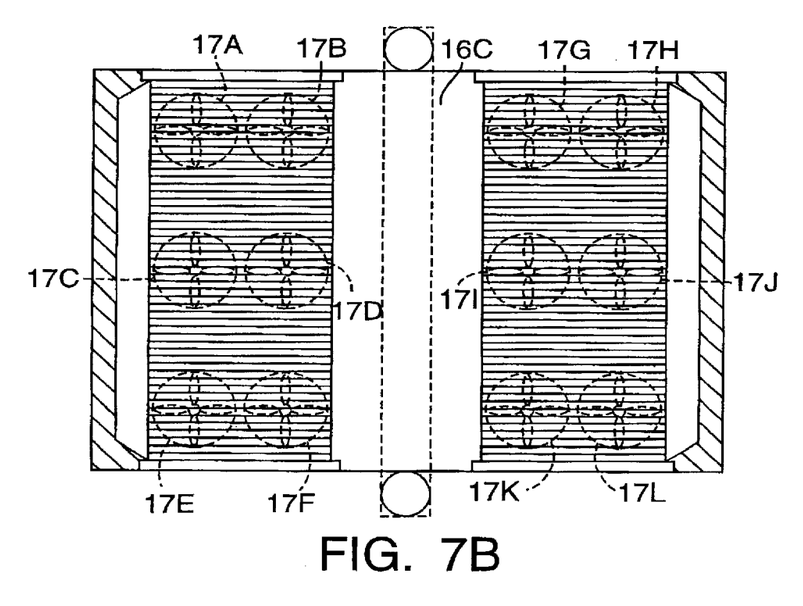

FIGS. 7A and 7B illustrate an embodiment of the invention wherein the manifold 14B directs oxidant reactant to twin cell stacks 12A and 12B, which are joined by a central fuel manifold 16C. The dividers 65A and 65B separate the fuel streams, as in FIG. 6, which are turned by turning fuel manifolds 16A and 16B. The blowers 17 draw the oxidizer reactant through the oxidizer manifold 14B and the cell stacks 12A and 12B, and can exhaust the oxidant input reactant to the ambient environment via windows in the manifolds 14A. FIG. 7B is a cross section of the apparatus of FIG. 7A taken along the section line 7B—7B of FIG. 7A. Multiple blowers 17A—17L are mounted with the manifolds 14A. Note that the use of multiple blowers can reduce the packaging volume of twin stack fuel cell assemblies, as shown in FIGS. 7A and 7B. For example, the use of 6 fans with each manifold 14A allows the depth of the manifold, as indicated by reference numeral 100, to be less than the depth if only four blowers are used, and in turn the use of eight blowers would allow the depth 100 to reduced over the use of six blowers.

It is thus seen that the invention efficiently attains the objects set forth above, among those made apparent from the preceding description. Because certain changes may be made in the above constructions without departing from the scope of the invention, it is intended that all matter presented in the above description or shown in the accompanying drawings be interpreted as illustrative and not as limiting. For example, blower can be associated with a fuel cell stack other than by mounting a blower directly to or within the inner volume defined by of a manifold. Also, as is known in the art, fuel cells need not have fuel delivered by the fuel manifolds such as those shown in FIGS. 2, 5, 6 and 7. It is known in the art to deliver fuel axially via axial fluid communication passages defined by the plates of the cell stack. Such alternative techniques for the delivery of fuel reactants are intended to be within the scope of the present invention.

It is also understood that the following claims are to cover a generic and specific features of the invention described herein and all statements of the invention, which, as a matter of language, might be said to fall there between.

What is claimed as new is:

1. A method of providing input reactants to a fuel cell stack assembly including a plurality of individual fuel cells and adapted for providing anode and cathode flow fields for exposing the cathodes and anodes of the individual fuel cells to input and oxidizer reactants, respectively, comprising the steps of:

providing oxidizer input and exhaust manifolds in fluid communication with said cathode flow fields;

mounting a plurality of blowers within the exhaust manifold, with at least one of said blowers oriented to control the flow of the oxidizer through a first group of the cathode flow fields, and at least one of another of said blowers oriented to control the flow of oxidant through a second group of the cathode flow fields;

operating the blowers at different speeds to selectively flow the oxidizer to the cathode flow fields for controlling one of the temperature, voltage, oxygen concentration, humidity and the electrical power output of the fuel cell stack assembly.

2. A method of providing oxidizer input reactants to a fuel cell power plant having a fuel cell stack, the fuel cell stack having a plurality of cathode flow fields, comprising the steps of:

providing the plurality of cathode flow fields with a plurality of variable speed blowers;

orienting the blowers within an oxidant exhaust manifold of the fuel cell stack for drawing oxidizer through the cathode flow fields thereof; and operating the blowers for flowing oxidizer through the flow fields of the fuel cell stack, with at least two blowers operating at different speeds.

* * * * *